United States Patent [19]

Hergenrother

[11] 4,241,604
[45] Dec. 30, 1980

[54] NIGHTTIME WIND DIRECTION AND SPEED INDICATOR

[76] Inventor: Rudolf C. Hergenrother, Rte. 2, 45 Hidden River La., Sarasota, Fla. 33582

[21] Appl. No.: 93,883

[22] Filed: Nov. 13, 1979

[51] Int. Cl.³ .............................................. G01W 1/04
[52] U.S. Cl. ....................................... 73/189; 340/25
[58] Field of Search ................... 73/188, 189; 340/26, 340/601

[56] References Cited

U.S. PATENT DOCUMENTS

| 1,496,486 | 6/1924 | Pedu | 340/26 X |
|---|---|---|---|
| 1,605,086 | 11/1926 | Watson | 73/188 |
| 1,874,214 | 8/1932 | Werner | 340/25 X |
| 1,942,039 | 1/1934 | Tyler | 73/188 |
| 1,976,706 | 10/1934 | Werner | 340/25 X |
| 1,989,095 | 1/1935 | Howard | 73/188 |
| 2,665,583 | 1/1954 | Anjanos | 73/189 |
| 2,969,672 | 1/1961 | Sell, et al. | 73/189 |
| 3,068,692 | 12/1962 | Morgan | 73/189 |
| 3,360,989 | 1/1968 | Herrington | 73/229 |
| 3,537,310 | 11/1970 | Barrett | 73/188 |
| 3,541,855 | 11/1970 | Frenzen et al. | 73/229 |
| 3,762,876 | 10/1973 | Koehler | 73/189 |

*Primary Examiner*—Charles A. Ruehl
*Attorney, Agent, or Firm*—Benjamin P. Reese, II

[57] ABSTRACT

A new and improved device for measurement and visual indication of both wind direction and wind speed. The device is suitable for use as a visual aircraft landing aid located at or near an airport to provide both wind direction and wind speed information to pilots desiring to land at the airport. A cylindrical lamp housing having a wind vane mounted on its top is rotatably mounted on a support post having a high intensity lamp mounted on its top and centered in the lamp housing. A lens is mounted on the interior surface of the cylindrical sides of the lamp housing at a location directly below the wind vane. The lens projects light emitted from the lamp to a concentric ring-shaped light scattering target positioned on the ground surrounding the device. When the wind vane is moved by the wind, the lamp housing and lens rotates and moves the lamp image to a new location on the target to visually indicate the wind direction. A revolving cup anemometer is mounted on the top cover of the lamp housing and concentric with the support post. The drive shaft of the anemometer rotates a shutter between the lamp and the lens to interrupt light transmission, and thereby, flash the lamp image on the target at a rate which is responsive to the wind speed. In addition, the revolving action of the shutter will cause the lamp and the lamp housing to appear to flash at a rate which is responsive to the wind speed.

8 Claims, 2 Drawing Figures

NIGHTTIME WIND DIRECTION AND SPEED INDICATOR

BACKGROUND OF THE INVENTION

This invention relates to a new and improved device for measurement and visual indication of both wind direction and wind speed. The primary use for the device is as a visual aircraft landing aid located at or near an airport to provide both wind direction and wind speed information to pilots desiring to land aircraft at the airport.

It is well known to aircraft pilots and others interested in aviation that knowledge of both the direction and the speed of horizontal surface winds in the immediate vicinity of the runway is very important to the pilot of an aircraft during landing maneuvers. Because of the importance of this information, the air traffic controller at each airport having a manned air traffic control tower routinely provides wind direction and wind speed information to every pilot calling the tower to request clearance for landing. But, pilots desiring to land at an airport which either does not have an air traffic control tower or has an unmanned air traffic control tower must rely on visual indications of wind direction and wind speed to acquire the information which he or she needs. And, of course, if the pilot loses radio contact with a manned air traffic control tower, he or she must rely on visual indications of wind direction and wind speed. While the wind itself can create natural visual indications of its direction and speed, it is desirable to have a visual aircraft landing aid located near the runway to provide the wind direction and wind speed information which is needed by the pilot.

Various devices which measure and visually indicate wind direction and which are suitable for use as visual aircraft landing aids are well known in the art. Only three basic types of the known devices are in general use as visual aircraft landing aids: the wind sock, the wind tetrahedron and the wind vane. While each type of known device has its own advantages and disadvantages, most pilots and other persons interested in aviation are of the opinion that all of the known devices are satisfactory for use during periods of high visibility. But, none of the known devices are satisfactory for use during the nighttime hours and other periods of low visibility.

Various devices for measuring and visually indicating wind direction have been proposed for use as visual aircraft landing aids during the nighttime hours and other periods of low visibility. For example, U.S. Pat. No. 1,605,086, issued to Watson in 1926 for a Device for Indicating the Direction of the Ground Wire to Aviators, discloses a "T" shaped wind vane having a light source which illuminates the top of the vane. The closely related concept of a dome-shaped wind direction indicating device having a fin or vane which is illuminated by an interior light source is disclosed in U.S. Pat. No. 3,537,310, issued to Barrett in 1968 for a Wind Direction Indicating Runway Marker. And, U.S. Pat. No. 1,942,039, issued to Tyler in 1929 for a Wind Signal, discloses a wind vane with means for projecting a light beam on a line parallel with the plane of the indicating vane or arrow. Furthermore, a conventional revolving airways beacon having means for deviating the light beam once during each revolution to indicate the wind direction to pilots of aircraft approaching the airport is disclosed in U.S. Pat. No. 1,989,095, issued to Howard in 1929 for a Wind Direction Indicating Airways Beacon.

None of the aforementioned devices are in general use as visual aircraft landing aids. Rather, the general practice at most airports is to use external light sources to illuminate the conventional wind sock(s), wind tetrahedron(s) or wind vane(s) in use at the particular airport during the nighttime hours and other periods of low visibility. Often, light colored stones or other light colored materials are placed on the ground in a circular area surrounding the device to improve the efficiency of the lighting sources used for illumination. Even when known devices are surrounded by such materials, it is often difficult for a pilot to locate the wind direction indicating device during his or her landing approach to the airport. Under the best of conditions, it is usually not possible for a pilot to see a conventional device for a distance of more than one mile during the nighttime hours or other periods of low visibility.

Because of its relatively low cost, the conventional wind sock is the most widely used device for measuring and visually indicating wind direction to a pilot desiring to land at an airport. But, it is well known by pilots and others interested in aviation that the visual indications of wind direction obtainable from a wind sock are often difficult to interpret. It is not unusual for a pilot to misjudge the wind direction when relying on a wind sock during periods of rapidly changing wind direction. And, such pilot errors occur much more frequently during the nighttime hours and other periods of low visibility.

Devices for measuring and visually indicating wind speed which are suitable for use as visual aircraft landing aids are unknown in the prior art. When a pilot desires to land his or her aircraft at an airport which does not have an air traffic control tower, has an unmanned tower or has a manned tower which the pilot is unable to contact by radio, he or she must rely on natural indications of wind speed, such as blowing dust, ripples and waves on nearby bodies of water, tree movement and the like. And, of course, such natural indications usually are not available to the pilot during the nighttime hours and other periods of low visibility. Thus, a substantial safety hazard exists for both the pilot and his or her passengers each time a landing is attempted under the aforementioned circumstances.

SUMMARY OF THE INVENTION

The present invention provides a new and improved device for measurement and visual indication of both wind direction and wind speed. The device is suitable for use as a visual aircraft landing aid at or near an airport to provide both wind direction and wind speed information to pilots desiring to land at the airport. The device overcomes the disadvantages inherent in prior art devices for measuring and visually indicating wind direction during the nighttime hours and other periods of low visibility. In addition, the device provides a means for measuring wind speed and visually indicating wind speed to a pilot desiring to land at an airport which does not have an air traffic control tower, has an unmanned tower or has a manned tower which the pilot is unable to contact by radio.

The device of the present invention is comprised of a cylindrical lamp housing rotatably mounted on a support post, a wind vane attached to said lamp housing for rotation of said lamp housing in response to changes in wind direction, and a revolving cup anemometer. Preferably, the anemometer is mounted on the top cover of the lamp housing and concentric with the support post. For optimum results, an opaque material is used for the base plate, a transparent material is used for the cylindrical sides and a translucent material is used for the top cover of the lamp housing. A high intensity lamp having a vertically oriented filament is positioned in the center of the lamp housing. A suitable lens is mounted on the interior surface of the lamp housing for rotation with the lamp housing and for projection of the light emitted by the lamp onto a light scattering target located external to the device. Suitable means, such as a rotating mechanical shutter, are provided for flashing the lamp and the lamp image projected and focused on the externally located light scattering target at a rate responsive to the wind speed measured by the anemometer.

For use as a visual aircraft landing aid, the device of the present invention is installed at a convenient location near the airport runway(s). A concentric ring-shaped light scattering target having its upper surface positioned in a horizontal plane is installed around the device at an appropriate distance from the device. Almost any material having a dull white surface coating is suitable for use as a light scattering target. Preferably, the light reflecting target is installed directly on the ground or a short distance above its surface to assure that the target is visible from the air at the greatest possible distance from the airport.

Operation of the device of the present invention as a visual aircraft landing aid is not significantly more complex than operation of a conventional wind tetrahedron, wind vane or revolving cup anemometer. When the wind direction changes, the force of the wind acting on the wind vane causes the lamp housing including the lens mounted on its interior surface, to rotate to a new position. This causes the lamp image which is being projected onto the concentric ring-shaped light scattering target to move to a new position. In this manner, the lamp image provides a continuous visual indication of the wind direction. If a suitable lamp and lens are used with the device and the lens is focused properly, the lamp image projected onto the light scattering target can easily be seen from a distance of one-half mile or more during the nighttime hours or other periods of low visibility.

In the preferred embodiment of the device of the present invention, the drive shaft of the revolving cup anemometer rotates a mechanical shutter which passes between the lamp and the lens mounted on the interior surface of the lamp housing once during each complete rotation of the anemometer. This causes the lamp image projected onto the light scattering target to flash at a rate which is responsive to the wind speed measured by the anemometer. In addition, the lamp and the lamp housing will appear to flash at a rate which is responsive to the wind speed measured by the anemometer. The lighted lamp housing is visible from a distance of two miles or more during the nighttime hours and other periods of limited visibility and for a lesser distance during normal daylight hours. Therefore, it is possible for an experienced pilot to judge the approximate wind speed from this visual indication of wind speed under almost all visibility conditions which he or she may expect to encounter.

These and many other advantages, features and objects of the present invention will be apparent from the following brief description of drawings, description of the preferred embodiment and claims.

DESCRIPTION OF THE PREFERRED EMBODIMENT

Figure 1:
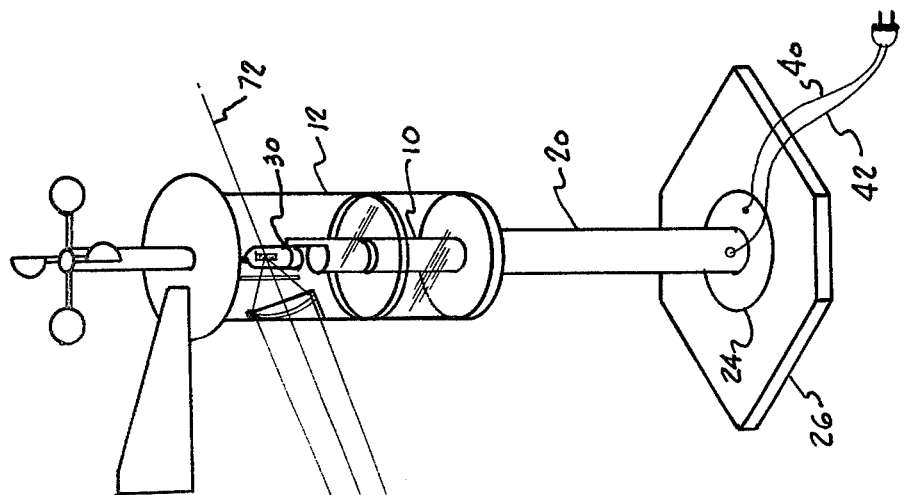
FIG. 1 is a three-dimensional view of a device incorporating concepts of the present invention with a light beam projected therefrom and focused on a concentric ring-shaped, ground-level light scattering target.
Figure 1:
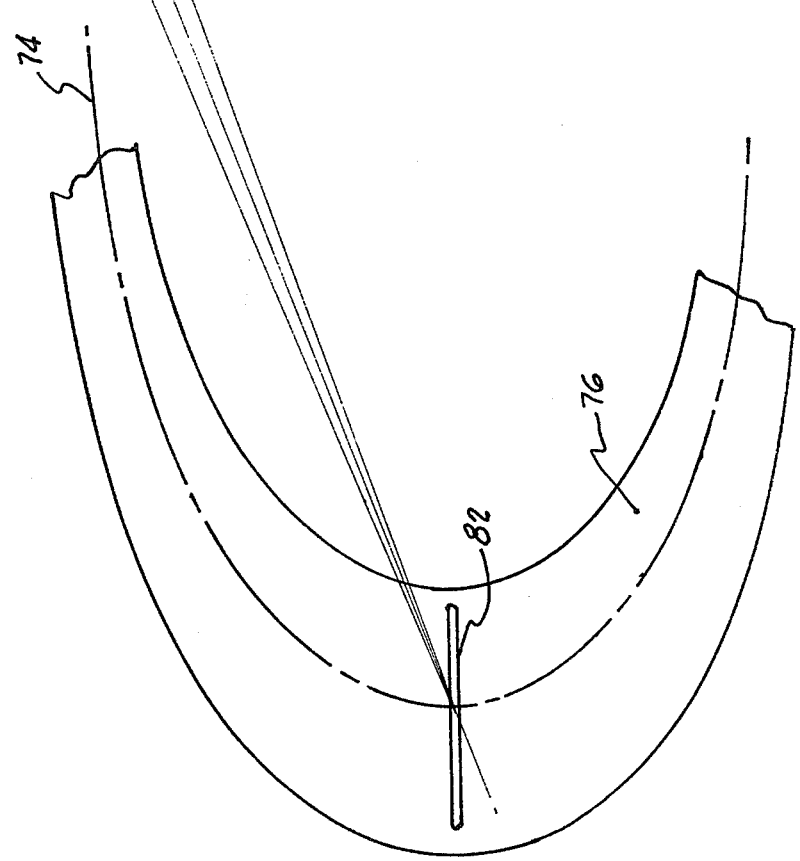
Figure 2:
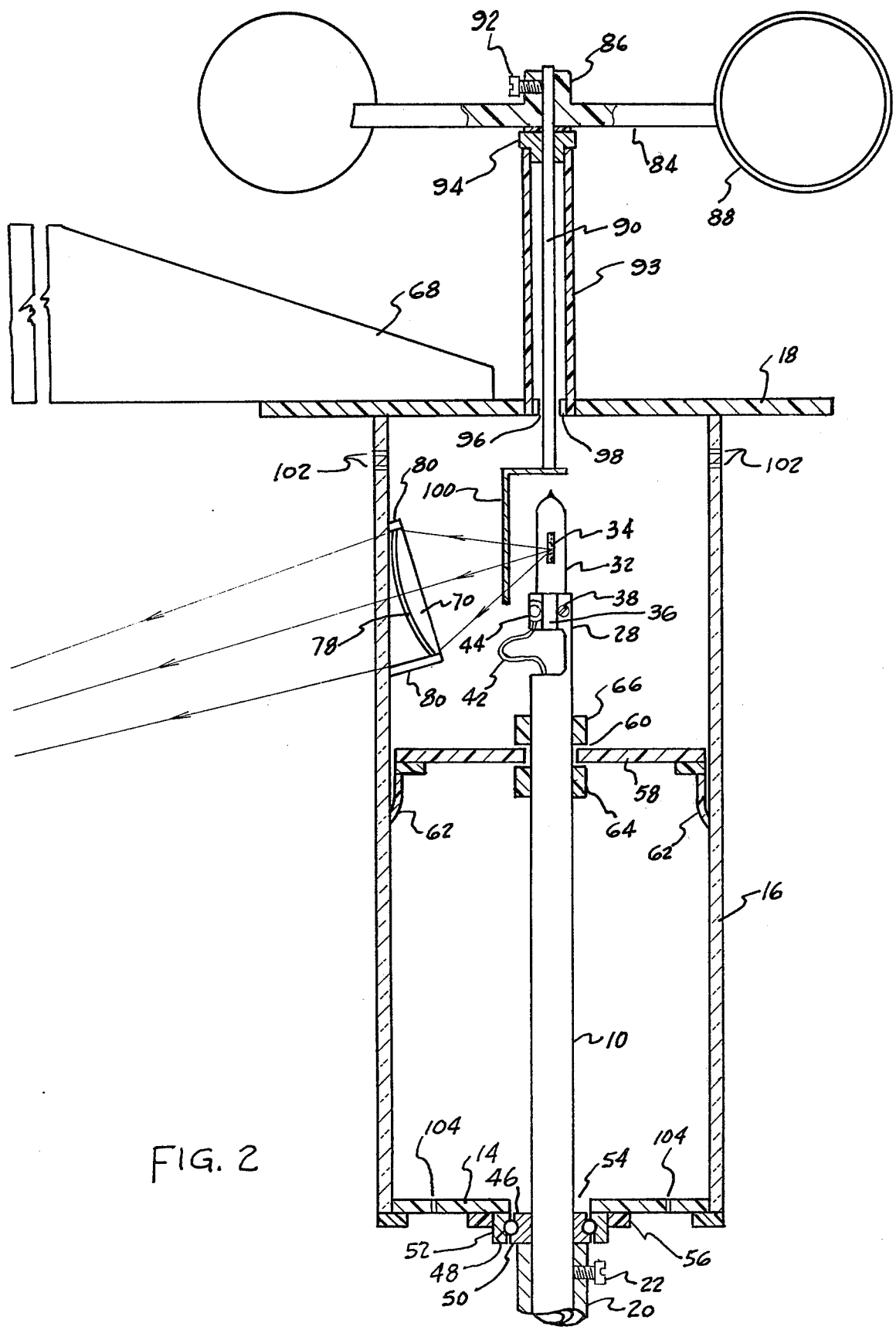
FIG. 2 is a vertical cross-sectional view of the lamp housing for the device illustrated in FIG. 1.

The preferred embodiment of the present invention is illustrated in FIGS. 1 and 2.

Referring to FIGS. 1 and 2, the device which is illustrated is comprised of a hollow support post 10 having a cylindrical lamp housing 12 rotatably mounted thereon. A conventional steel or other metal alloy pipe or tube is suitable for fabrication of the support post 10. As illustrated in detail in FIG. 2, the lamp housing 12 has a circular base plate 14, cylindrical sides 16 and a circular top cover 18. For optimum results, an opaque material is used for the base plate 14, a transparent material is used for the cylindrical sides 16 and a translucent material is used for the top cover 18. While any structural material having the desired optical characteristics can be used to fabricate the lamp housing 12, suitable lightweight plastic materials, such as Lucite and Plexiglas, are preferred. Such materials are available in a variety of standard shapes and sizes which can be easily cut to form the required components of the lamp housing 12. Conventional adhesives can be used to bond the required components at the appropriate locations.

The bottom of the support post 10 is fitted inside the top opening of a hollow support column 20. The threads of a conventional set screw 22 engage a threaded cylindrical hole through the wall of the support column 20 to provide means for tightening its face against the exterior surface of the support post 10 to hold said support post in position at the desired height. The support column 20 is fabricated from a conventional steel or other metal alloy pipe or tube. A flange 24 is attached to the bottom end of the support column 20 by conventional means, such as engaging exterior threads on the support column 20 with interior threads in a cylindrical opening in the top of the flange 24.

The flange 24 is attached to a support base 26 by conventional means, such as screws or bolts. The support base 26 is a concrete slab or a slab of another material of sufficient weight to assure that the device is not blown over by high speed winds during its operation. And, of course, the support base 26 can be eliminated if it is desired to permanently install the device with the support column 20 embedded in a sufficient mass of subterranean concrete.

A lamp support 28 is provided on the top of the support post 10. The lamp support 28 can be fabricated by various conventional means, including cutting away all but a small segment of the top portion of the pipe or tube used to fabricate the support post 10 and bending the remaining segment to create a flat surface near its unattached end. A high intensity lamp 30, having an envelope 32 with a vertical filament 34 centered in its interior and having a metal base 36, is attached to the lamp support 28 by conventional means, such as a screw 38 which passes through a cylindrical hole in said lamp support base and engages a threaded cylindrical hole in said metal base. While the inventor has achieved excellent results by using a fifty-five watt quartz halogen lamp as the high intensity lamp 30, other high intensity lamps would be suitable as a light source for the device of the present invention. But, any such lamp must have a vertical filament and must have its terminals or other attaching hardware located such that the light emitted by the lamp is not obstructed by said hardware.

The support post 10, the support column 20 and an insulated wire 40 function as one electrical conductor between the lamp 30 and a conventional electric power source external to the device. A flexible insulated wire 42 is fastened to the metal base 36 of the lamp 30 by conventional means, such as a clip 44 on one end of said wire. The wire 42 passes through the hollow interior of the support post 10 and the support column 20 and exits the support column 20 through its bottom opening or another convenient location for connection to the electric power source to complete the electrical circuit between said power source and the lamp 30. While the lamp 30 and its associated circuitry which has been described comprises an electric lamp system, it will be readily appreciated by those skilled in the lighting arts that a suitable gas lamp system could be substituted for the electric lamp system which has been described.

A ring-shaped support bearing 46 is positioned on the exterior of the support post 10 and rests on the top of the support column 20 for its vertical support. While various conventional bearings are suitable for use as the support bearing 46, either a thrust bearing or a ball bearing is preferred. The support bearing 46 which is illustrated in detail in FIG. 2 is a conventional ball bearing having a plurality of balls 48 confined by an inner ring 50 and an outer ring 52. When this type of support bearing is utilized, the inner ring 50 rests on top of the support column 20.

The base plate 14 of the lamp housing 12 has a cylindrical opening 54 through its center. When the device is assembled for operation, the support post 10 projects through the cylindrical opening 54 through the center of the base plate 14 with said base plate resting on top of the outer ring 52 of the support bearing 46. The cylindrical opening 54 is of sufficient diameter to assure unrestrained rotation of the base plate 14 around the support post 10. And, a positioned ring 56 fastened to the bottom surface of the base plate 14 by conventional means, such as adhesive bonding, maintains said base plate in its proper location.

A cylindrical centering plate 58 having a cylindrical opening 60 through its center is mounted on the interior surface of the cylindrical sides 16 by a plurality of flexible mounts 62. Preferably, the centering plate 58 and the flexible mounts 62 are fabricated from a suitable lightweight plastic material, such as Lucite or Plexiglas, bonded to each other with an adhesive, and said flexible mounted bonded to said interior surface of said cylindrical sides with an adhesive. When the device is assembled for operation, the support post 10 projects through the cylindrical opening 60 through the center of the centering plate 58. The cylindrical opening 60 is of sufficient diameter to assure unrestrained rotation of the centering plate 58 around the support post 10. And, a lower positioning ring 64 and an upper positioning ring 66 fastened to the support post 10 by conventional means, such as adhesive bonding, assures that the centering plate 58 rotates at the proper vertical location. It will be readily appreciated by those skilled in the mechanical arts that the above described structural arrangement permits rotation of the lamp housing 12 with only minimal frictional forces resisting rotation.

A wind vane 68 is fastened to the top cover 18 of the lamp housing 12 by conventional means, such as adhesive bonding. While other lightweight structural materials can be used to fabricate the wind vane 68, suitable lightweight plastic materials, such as Lucite and Plexiglas, are preferred. In the preferred embodiment, the diameter of the top cover 18 is greater than the diameter of the cylindrical sides 16 of the lamp housing 12. This not only provides support for the wind vane 68 but also improves the visibility of the lamp housing 12 at distances remote from the device. Since a translucent material is used for the top cover 18, most of the light emitted from the lamp 30 is directed in a generally horizontal direction by the overhang of said top cover after it passes through the transparent cylindrical sides 16.

A suitable projecting lens 70 is mounted on the interior surface of the cylindrical sides 16 below the wind vane 68 with the center of the lens 70 located on a vertical axis through the center of the wind vane 68. The lens 70 is positioned such that its center is located on an inclined axis 72 through the center of the filament 34 of the lamp 30 and through a circular axis 74 located on the surface of a concentric ring-shaped light scattering target 76 positioned in a horizontal plane around the device. Preferably, a suitable colored, such as amber, filter 78 is positioned over the lens 70. Conventional means, such as a pair of lightweight plastic mounting brackets 80 adhesive bonded to the interior surface of the cylindrical sides 16, are used to mount the lens 70 with its filter 78 in the above described location.

The lens 70 projects a portion of the light emitted from the filament 34 of the lamp 30 along the inclined axis 72 and focuses an image of said filament on the surface of the light scattering target 76. At the same time, light transmitted through the cylindrical sides 16 of the lamp housing 12 illuminates the entire surface of the light scattering target 76. Preferably, the light scattering target 76 is fabricated from a material having a dull white surface coating and is installed directly on the ground or a short distance above the surface of the ground at an appropriate distance from the lamp housing 12. It will be recalled that the lamp post 10 can be moved upward or downward by adjusting the set screw 22. And, of course, this provides a means for focusing the lens 70 such that a distinct lamp image 82 is projected on the light scattering target 76. With the combination of elements described above and a properly focused lens, both the light scattering target 76 and the lamp image 82 on said target can easily be seen from a distance of one-half mile or more during the nighttime hours or other periods of low visibility.

Operation of the device illustrated in FIGS. 1 and 2 as a visual aircraft landing aid for indicating wind direction is not significantly more complex than operation of a conventional wind tetrahedron or wind vane. When the wind direction changes, the force of the wind acting on the wind vane 68 fastened to the top cover 18 of the lamp housing 12 causes the lamp housing 12 to rotate. Since the lens 70 is mounted on the interior surface of the cylindrical sides 16 of the lamp housing 12, the lens 70 is rotated to a new position. As the lens 70 is rotated, the lamp image 82 which it is projecting and focusing on the light scattering target 76 is moved to a new position. Since the lens 70 is positioned directly below the wind vane 68 with its center on a vertical axis through the center of said wind vane, the lamp image 82 visually indicates the wind direction. And, of course, the resulting visual indication of wind direction is continuous.

In the device illustrated in FIGS. 1 and 2, a conventional rotating cup anemometer is mounted on the top surface of the top cover 18 of the lamp housing 12. The anemometer is comprised of a plurality of arms 84 radiating from a center sprocket 86. Each arm 84 has a conventional hemispherical or cone-shaped anemometer cup 88 on its outermost end. While various materials and fabrication methods can be used, the arms 84, center sprocket 86 and cups 88 which are illustrated were fabricated as a single piece of lightweight plastic material by a conventional molding process. The center sprocket 86 has a vertical cylindrical hole through its center for fitting said sprocket on the upper end of a cylindrical drive shaft 90. A set screw 92 engages interior threads in a horizontal cylindrical hole through the wall of the center sprocket 86 and is tightened to securely fasten said center sprocket to the drive shaft 90. The drive shaft 90 which is illustrated was fabricated from a conventional steel alloy rod, but many other materials are suitable for that purpose.

A hollow cylindrical support post 93 is attached to the top cover 18 of the lamp housing 12 by conventional means. The support post 93 is positioned concentric with the support post 10 and the lamp 30 located on the top of the support post 10. A ring-shaped, low friction support bearing 94, such as a conventional magnetic bearing or a conventional Teflon washer, is attached to the top of the support post 93. The top cover 18 of the lamp housing 12 has a vertical cylindrical hole 96 through its center to enable the drive shaft 90 to pass through the top cover 18 for rotation in the interior of the lamp housing 12 when the center sprocket 86 rotates on the support bearing 94. The support post 93 illustrated in FIG. 2 is fabricated from a lightweight plastic tube and adhesive bonded to the interior of the cylindrical hole 96 through the top cover 18. A centering ring 98 is positioned in the lower opening of the support post 93 by conventional means, such as adhesive bonding. A mechanical shutter is attached to the bottom end of the drive shaft 90 by conventional means, such as by welding or with metal screws, bolts or rivets. While a single vane shutter has been illustrated in FIGS. 1 and 2, a multi-vane shutter can be used if desired.

Operation of the device illustrated in FIGS. 1 and 2 as a visual aircraft landing aid for indicating wind speed is not significantly more complex than operation of a conventional revolving cup anemometer. As with any revolving cup anemometer, the force of the air entering the open volume of the cups 88 causes the cups 88 to move. When this occurs, the center sprocket 86 rotates the drive shaft 90. Rotation of the drive shaft 90 moves the shutter 100 between the lamp 30 and the lens 70 to interrupt light transmission to said lens once during each complete revolution of said drive shaft. And, of course, the light transmission to the lens 70 will be interrupted more than once during each complete revolution of the drive shaft 90 if the shutter 100 used with the device has more than one vane. This causes the lamp image 82 on the light scattering target 76 to flash at a rate which is responsive to the wind speed. In addition, the lamp 30 and the lamp housing 12 will appear to flash at a rate which is responsive to the wind speed measured by the anemometer. Usually, an experienced pilot can judge the wind speed with reasonable accuracy by observing this visual indication of wind speed. And, the lamp housing 12 will be visible to a pilot approaching the airport at a distance of two miles or more during the nighttime hours and other periods of limited visibility and for a lesser distance during normal daylight hours.

While not essential for operation of the device which has been described, it has proved to be expedient to provide a plurality of small horizontal holes 102 through the wall of the cylindrical sides 16 of the lamp housing 12 at locations above the top of the lamp 30 and to provide a plurality of small vertical holes 104 through the base plate 14 of said lamp housing. These holes allow natural cooling of the lamp 30. Also, the holes 104 through the base plate 14 allow any condensation or other moisture in the lamp housing 12 to drain out of said lamp housing. Preferably, all holes are screened to prevent insects from entering the lamp housing 12.

While the present ivention has been disclosed in connection with its preferred embodiment, it should be understood that there may be other embodiments which fall within the spirit and scope of the invention as defined by the following claims.

I claim:

1. A device for measuring and visually indicating both wind direction and wind speed, comprising:
   (a) a lamp positioned in a lamp housing having transparent sides;
   (b) a lens for projecting light emitted from said lamp on the surface of a light scattering target external to the device to create a lamp image on said light scattering target;
   (c) means for moving said lens in response to changes in wind direction such that said lamp image visually indicates wind direction; and
   (d) means for flashing said lamp housing and said lamp image at a rate which is responsive to wind speed thereby visually indicating wind speed.

2. A device for measuring and visually indicating both wind direction and wind speed as recited in claim 1, wherein said means for moving said lens in response to changes in wind direction includes a wind vane mounted on said lamp housing, means for mounting said lens on said lamp housing, and means for rotatably mounting said lamp housing on a support post for said lamp.

3. A device for measuring and visually indicating both wind direction and wind speed as recited in claim 1, wherein said means for flashing said lamp housing and said lamp image at a rate which is responsive to wind speed includes a revolving cup anemometer having a drive shaft which rotates a shutter between said lamp and said lamp housing and between said lamp and said lens to interrupt light transmission.

4. A device for measuring and visually indicating both wind direction and wind speed as recited in claim 3, wherein said revolving cup anemometer is mounted on said lamp housing concentric with a support post for said lamp.

5. A device for measuring and visually indicating both wind direction and wind speed as recited in claim 1, wherein said means for moving said lens in response to changes in wind direction includes a wind vane mounted on said lamp housing, means for mounting said lens on said lamp housing, and means for rotatably mounting said lamp housing on a support post for said lamp; and wherein said means for flashing said lamp housing and said lamp image includes a revolving cup anemometer mounted on said lamp housing concentric with said support post for said lamp, said revolving cup anemometer having a drive shaft which rotates a shutter between said lamp and said lamp housing and between said lamp and said lens to interrupt light transmission.

6. A device for measuring and visually indicating both wind direction and wind speed as recited in claim 5, wherein the light scattering target external to the device is a concentric ring-shaped light scattering target positioned on the ground surrounding the device.

7. A device for measuring and visually indicating both wind direction and wind speed as recited in claims 1, 2, 3, 4, 5 or 6, wherein said lamp is a high intensity electric lamp.

8. A device for measuring and visually indicating both wind direction and wind speed as recited in claims 1, 2, 3, 4, 5 or 6, wherein said lamp is a quartz halogen electric lamp having a vertically oriented filament.

* * * * *